Patented Dec. 2, 1930

1,783,334

UNITED STATES PATENT OFFICE

HARRY SANDERLIN KEELAN, OF BROOKLYN, NEW YORK, ASSIGNOR TO E. R. SQUIBB AND SONS, OF BROOKLYN, NEW YORK, A CORPORATION OF NEW YORK

COLLOIDAL SILVER IODIDE COMPOUND AND METHOD OF PREPARING SAME

No Drawing.     Application filed January 13, 1927.  Serial No. 161,023.

This invention relates to germicidal solutions and to an improved reversible colloidal silver iodide which can be reduced to a dry form without destroying its capacity to resume the colloidal form when it is again mixed with water. The invention comprehends also a process of preparing the improved product.

The known colloidal silver iodide preparations are deficient particularly in respect to germicidal power when measured with due consideration to the time factor. Such preparations require a very considerable time to accomplish the desired effect and this characteristic renders them substantially useless for many applications.

It is the object of the present invention to provide an improved colloidal silver iodide compound having markedly increased germicidal power and being capable of exercising this power in a relatively short time.

Another object of the invention is the provision of a method of preparing the improved product hereinafter described.

Other objects and advantages of the invention will be apparent as it is better understood by reference to the following specification in which the preferred embodiments are described.

Colloidal silver iodide has been prepared heretofore by the direct action of iodine upon colloidal silver in a protecting colloid such as oxidized gelatin. In this reaction the iodine acts as an acid to dissolve the metallic silver.

I have discovered that an improved colloidal silver iodide can be prepared by a metathetical reaction involving an interchange of ions, the reaction being represented by the following equation:

$$AgX + MeI = AgI + MeX$$

In this equation Me represents an alkali or alkaline earth metal and X may be any negative ion or group, either inorganic or organic, which is capable of forming an insoluble silver salt in the form of a colloid prior to the addition of the iodide thereto. Examples of suitable silver salts are the oxide or hydroxide, the chloride, carbonate, oxalate, proteinate, etc. The term "salt" as used in the specification and claims includes silver compounds which are not salts according to strict chemical terminology.

The invention is not limited to any particular method of producing the colloidal silver salt with the hydrolyzed protein which serves as a protecting colloid. The colloidal solution may be prepared in a variety of ways. Thus, for example, a quantity of gelatin can be hydrolyzed with a small amount of sodium hydroxide for about one half hour and then cooled and filtered. A solution of sodium chloride and another of silver nitrate can be added then simultaneously to the gelatin. The result is a milk white colloidal solution of silver chloride. A colloidal solution of silver oxalate may be prepared likewise by adding solutions of silver nitrate and sodium oxalate to the hydrolyzed gelatin. Instead of preparing colloidal silver chloride or oxalate, one may prepare any silver compound which is relatively insoluble in water but which is more soluble than silver iodide, e. g., silver oxide, hydroxide, carbonate or proteinate.

When the colloidal solution of the silver salt has been prepared a solution of an alkali metal iodide such as sodium iodide can be added thereto, the mixture being subjected to mechanical agitation for a period of about three hours or until the reaction is complete, and a yellow colloidal silver iodide is formed. The solution should be dialyzed then for about forty hours and evaporated in vacuo if a dry product is desired.

As a specific example of the invention 40 grams of Silver Label gelatin are boiled under a reflux condenser for one half hour with 1.6 grams of sodium hydroxide and 500 cc. of water and the solution is cooled and filtered. This solution is then placed in a two-liter beaker fitted with a good mechanical stirrer. 17 grams of silver nitrate are dissolved in 100 cc. of water and 6 grams of sodium chloride are dissolved in 100 cc. of water. These two solutions are then added simultaneously to the hydrolyzed gelatin solution and stirred, care being taken that the chloride is always slightly in excess. The result is a milk-white colloidal solution. Throughout the procedure as described the solution should be kept at room temperature to avoid the reduction of the silver salts to colloidal silver. Colloidal silver does not react with the iodine salt and any silver which is present in the metallic form is therefore lost. 25 grams of sodium iodide are next dissolved in 300 cc. of water and the solution is added slowly through a dropping funnel to the colloidal silver salt solution with agitation. The resulting mixture is agitated for about three hours or until the reaction is complete. Thereafter the solution is dialyzed through pig bladders or collodion membranes for about forty hours and evaporated to dryness in vacuo.

The resulting product in the form of yellowish scales can be dissolved in any desired proportion to produce solutions having a strength suitable for the particular purpose for which the product is used. Such solutions contain the silver iodide in colloidal form. The solutions have no irritating effect upon mucous membrane, are practically odorless and tasteless, and are adapted especially for the treatment of the membranes of the nose and throat and also for treatment of the eyes. A ten per cent. solution when applied to the eyes several times daily for a number of weeks causes no irritation.

I have discovered that the product when prepared as described is markedly superior in germicidal power to colloidal silver iodides as heretofore known. The product is particularly effective owing to the rapidity of action, that is to say, the germicidal effect is completed within a relatively short period, usually less than two minutes as will be indicated hereinafter. The exact reason for this superiority of the product has not been determined and chemical analysis of the product does not indicate any difference in composition which would account therefor. Possibly the result depends upon a difference in the degree of dispersion or shape of the silver iodide particles in solutions. This, however, is a theory merely and it is not my intention to assert that any such differences actually exist.

I am aware of a product described in British Patent No. 206,954 which is produced by treating colloidal silver with iodine and I am also familiar with a well known market product containing colloidal silver iodide. The product prepared as described in the British patent and a sample of the market product have been subjected to the test hereinafter described for comparison of the germicidal power with the product prepared in accordance with the disclosure herein.

The test is as follows: Staphylococcus aureus culture No. 68 was grown for twenty-four hours at 37° C. on plain veal agar. The growth was washed off with sterile physiological salt solution and diluted so that the resulting emulsion contained 500 million bacteria per cc. Various dilutions of colloidal silver iodide were made with sterile distilled water and 9.9 cc. of each dilution were placed in separate test tubes. To each portion of 9.9 cc. of colloidal silver iodide solution was added 0.1 cc. standard staphylococcus aureus culture emulsion and the solutions were thoroughly mixed. The test tubes were then kept at room temperature, 15.5° to 21° C. and at the time indicated in the following tables one platinum loopful from each tube was planted in 10 cc. of beef extract broth. These broth tubes were incubated for forty-eight hours at 37° C. at which time readings were made. All of the tests were made in duplicate and all of the duplicate tubes read the same. The tubes showing growth are marked in the following tables with an "x" and those in which the culture had been killed and which showed no growth are marked with a minus sign. All glass-ware, apparatus and media used were the same as those recommended for the hygienic laboratory method published in U. S. Health Reports, vol. 6, No. 27, July 8, 1921. The results were as follows:

| Product | Time in minutes | | | | | |
|---|---|---|---|---|---|---|
| | 1 | 5 | 15 | 30 | 60 | 120 |
| *Market product* | | | | | | |
| 1-5 dilution | x | — | — | — | — | — |
| 1-10 dilution | x | — | — | — | — | — |
| 1-25 dilution | x | — | — | — | — | — |
| 1-50 dilution | x | x | — | — | — | — |
| 1-100 dilution | x | x | x | — | — | — |
| 1-200 dilution | x | x | x | x | — | — |
| *Colloidal silver iodide R-110-C* | | | | | | |
| 1-5 dilution | — | — | — | — | — | — |

| Product | Time in minutes | | | | | |
|---|---|---|---|---|---|---|
| | 1 | 5 | 15 | 30 | 60 | 120 |
| *Colloidal silver iodide R-110-C* | | | | | | |
| 1-10 dilution | — | — | — | — | — | — |
| 1-25 dilution | — | — | — | — | — | — |
| 1-50 dilution | — | — | — | — | — | — |
| 1-100 dilution | — | — | — | — | — | — |
| 1-200 dilution | — | — | — | — | — | — |
| *Colloidal silver iodide R-110-D* | | | | | | |
| 1-5 dilution | — | — | — | — | — | — |
| 1-10 dilution | — | — | — | — | — | — |
| 1-25 dilution | — | — | — | — | — | — |
| 1-50 dilution | — | — | — | — | — | — |
| 1-100 dilution | — | — | — | — | — | — |
| 1-200 dilution | — | — | — | — | — | — | x—Alive.
——Killed.

Samples labeled R–110 are products of this invention.

Since the product of the present invention kills at all dilutions and within all time intervals referred to above, no comparison can be made as the result of the above test. It is necessary, therefore, to compare samples of the market product with more dilute solutions of the product of the present invention. The results obtained were:—

| Product | Time in minutes | | | | | |
|---|---|---|---|---|---|---|
| | 1 | 5 | 15 | 30 | 60 | 120 |
| *Market product* | | | | | | |
| 1-5 dilution | – | – | – | – | – | – |
| 1-10 dilution | – | – | – | – | – | – |
| 1-25 dilution | x | x | – | – | – | – |
| 1-50 dilution | x | x | x | x | x | – |
| 1-100 dilution | x | x | x | x | x | x |
| 1-200 dilution | x | x | x | x | x | x |
| *Colloidal silver iodide R–110–F* | | | | | | |
| 1-200 dilution | – | – | – | – | – | – |
| 1-300 dilution | – | – | – | – | – | – |
| 1-400 dilution | – | – | – | – | – | – |
| 1-500 dilution | – | – | – | – | – | – |
| 1-600 dilution | – | – | – | – | – | – |
| 1-1000 dilution | x | x | x | x | x | – |

Another set of tests were made at still different concentrations:

| Product | Time in minutes | | | | | |
|---|---|---|---|---|---|---|
| | 1 | 5 | 15 | 30 | 60 | 120 |
| *Market product* | | | | | | |
| 1-5 dilution | x | – | – | – | – | – |
| 1-10 dilution | x | – | – | – | – | – |
| 1-25 dilution | x | – | – | – | – | – |
| 1-50 dilution | x | x | – | – | – | – |
| 1-100 dilution | x | x | x | – | – | – |
| 1-200 dilution | x | x | x | x | – | – |
| *Colloidal silver iodide R–110–P* | | | | | | |
| 1-400 dilution | – | – | – | – | – | – |
| 1-500 dilution | – | – | – | – | – | – |
| 1-600 dilution | – | – | – | – | – | – |
| 1-700 dilution | x | – | – | – | – | – |
| 1-800 dilution | x | x | – | – | – | – |
| 1-1000 dilution | x | x | – | – | – | – |
| *Colloidal silver iodide R–110–Q* | | | | | | |
| 1-400 dilution | – | – | – | – | – | – |
| 1-500 dilution | – | – | – | – | – | – |
| 1-600 dilution | – | – | – | – | – | – |
| 1-700 dilution | x | – | – | – | – | – |
| 1-800 dilution | x | x | – | – | – | – |
| 1-1000 dilution | x | x | x | – | – | – |
| *Colloidal silver iodide R–110–R* | | | | | | |
| 1-400 dilution | – | – | – | – | – | – |
| 1-500 dilution | – | – | – | – | – | – |
| 1-600 dilution | – | – | – | – | – | – |
| 1-700 dilution | – | – | – | – | – | – |
| 1-800 dilution | x | – | – | – | – | – |
| 1-1000 dilution | x | x | – | – | – | – |

The final comparison gave the following results:

"A"

| Product | Time in minutes | | | | | |
|---|---|---|---|---|---|---|
| | 1 | 5 | 15 | 30 | 60 | 100 |
| *Market product* | | | | | | |
| #1 1-5 (20%) | x | – | – | – | – | – |
| 2 1-10 (10%) | x | – | – | – | – | – |
| 3 1-25 (4%) | x | – | – | – | – | – |
| 4 1-50 (2%) | x | x | – | – | – | – |
| 5 1-100 (1%) | x | x | x | – | – | – |
| 6 1-200 (0.5%) | x | x | x | x | x | x |

| | | | | | 120 min. |
|---|---|---|---|---|---|
| *Market product* | | | | | |
| 1-5 dilution | – | – | – | – | – |
| 1-10 dilution | – | – | – | – | – |
| 1-25 dilution | x | x | – | – | – |
| 1-50 dilution | x | x | x | x | x |
| 1-100 dilution | x | x | x | x | x | x |
| 1-200 dilution | x | x | x | x | x | x |

"B"

| | 1 | 2½ | 5 | 7½ | 10 | |
|---|---|---|---|---|---|---|
| *Patented product* | | | | | | |
| 1-100 dilution | x | – | – | – | – | |
| 1-200 dilution | x | – | – | – | – | |
| 1-300 dilution | x | x | – | – | – | |
| 1-400 dilution | x | x | x | – | – | |
| 1-500 dilution | x | x | x | x | – | |

"C"

| R–110–F | | | | | | |
|---|---|---|---|---|---|---|
| 1-500 dilution | – | – | – | – | – | |
| 1-600 dilution | x | – | – | – | – | |
| 1-700 dilution | x | x | – | – | – | |
| 1-800 dilution | x | x | x | x | – | |
| 1-900 dilution | x | x | x | x | x | |
| *R–110–R.* | | | | | | |
| 1-500 dilution | – | – | – | – | – | |
| 1-600 dilution | – | – | – | – | – | |
| 1-700 dilution | x | – | – | – | – | |
| 1-800 dilution | x | x | x | x | x | |
| 1-900 dilution | x | x | x | x | x | |
| *R–110–R1.* | | | | | | |
| 1-500 dilution | – | – | – | – | – | |
| 1-600 dilution | – | – | – | – | – | |
| 1-700 dilution | x | – | – | – | – | |
| 1-800 dilution | x | x | – | – | – | |
| 1-900 dilution | x | x | x | x | x | |

The samples marked "A" and "B" were respectively a well known market product and the product prepared in accordance with the process as described in the British Patent No. 206,954. The samples marked "C" were the product prepared in accordance with the present invention. The results of the tests show conclusively the superiority of the product of the present invention over the products as heretofore known in that the new product in a dilution of 1 to 500 accomplished the destruction of the bacteria in one minute or less while relatively concentrated solutions in dilutions of 1 to 5 or 1 to 10 of the known products are necessary to produce this result. The new product is, therefore, at least sixty times as powerful as the colloidal silver iodide prepared by processes heretofore known and used considering the activity exerted during the first minute of contact. The first minute of contact is the one of greatest importance, because in the subsequent periods of time the solution is being drained or washed away. Furthermore, the activity of the new product is very marked as is indicated by the limited time required to destroy all of the bacteria even with dilutions of 1 to 500.

It is evident, therefore, that the process of preparing colloidal silver iodide as described herein results in a product having superior germicidal power. Both the process and the product are distinguished from those known heretofore, the process depending upon the reaction between a colloidal silver compound and an iodide as distinguished from the reaction of iodine upon colloidal silver and the product being differentiated by its increased germicidal effect.

Various changes may be made in the details of the process as described herein without departing from the invention or sacrificing any of the advantages thereof.

I claim:—

1. The process of preparing colloidal silver iodide, which comprises subjecting an insoluble silver salt in colloidal solution to reaction with an iodide of an alkali forming metal.

2. The process of preparing colloidal silver iodide, which comprises subjecting an insoluble silver salt in the presence of a protecting colloid to reaction with an iodide of an alkali forming metal.

3. The process of preparing colloidal silver iodide, which comprises subjecting an insoluble silver salt in a solution of hydrolyzed gelatin to reaction with an iodide of an alkali forming metal.

4. The colloidal silver iodide composition produced by the action of the iodide of an alkali forming metal upon an insoluble silver salt.

5. The colloidal silver iodide composition produced by the action of the iodide of an alkali forming metal upon an insoluble silver salt in the presence of a protecting colloid.

In testimony whereof I affix my signature.

HARRY SANDERLIN KEELAN.